UNITED STATES PATENT OFFICE.

ERNST WALDEMAR JUNGNER, OF STOCKHOLM, SWEDEN.

POSITIVE ELECTRODE FOR ACCUMULATORS WITH CONSTANT ELECTROLYTE.

SPECIFICATION forming part of Letters Patent No. 692,298, dated February 4, 1902.

Application filed March 16, 1900. Serial No. 8,974. (No specimens.)

*To all whom it may concern:*

Be it known that I, ERNST WALDEMAR JUNGNER, a citizen of the Kingdom of Sweden, residing at Stockholm, Sweden, have invented certain new and useful Improvements in Positive Electrodes for Accumulators with Constant Electrolytes; and I do hereby declare the following to be a full, clear, and exact description of the invention, such as will enable others skilled in the art to which it appertains to make and use the same.

In manufacturing primary and secondary elements it has always been a desideratum to produce a binding agent for the active mass to make the latter as coherent as possible without impairing the action of said mass.

The use of a binding material differing from the active mass has several inconveniences, in that the weight of the active mass is augmented, a very objectionable feature in accumulators, and that the conductivity of the mass is reduced, which causes disturbing effects in the element and local effects in the electrode, reducing the efficiency of the element.

The present invention relates to the mode of producing positive electrodes for accumulators in which is used a constant electrolyte, such as an alkali-metal-hydrate bath, the method of procedure being as follows: A grid or net of wire composed of a metal not acted upon by the electrolyte (alkali-metal-hydrate solution, and as a type of such metal nickel may be used) is coated with a mass of finely-reduced silver and silver chlorid. Mixed with the silver I may use any of its salts—such as the sulfid, sulfate, nitrate, or any of the compounds alone—the object being to re-reduce the mass to metal or oxid in the bath, and in connection with an invariable electrolyte will act as both metal and oxid. For instance, such a plate when combined with a negative cadmium suboxid plate will act as follows:

Charging

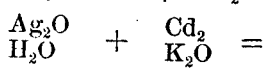

discharging.

Thus it will be seen that the potassium acts as a constant electrolyte. Water is formed at the positive and potassium oxid at the negative electrode, which products of decomposition cannot exist together in the solution independently, but immediately chemically recombine to form the original electrolyte. The mixture is then pressed and dried, and the electrode is heated up to or beyond the fusing-point of silver chlorid. The electrode is then immersed as cathode in an electrolyte, composed of a solution of an alkali-metal hydrate, whereby the chlorin is removed and pure silver remains in a coherent mass. The electrode produced in this manner is then placed as anode into a new bath of alkali-metal hydrate, whereby the silver is converted into oxid of silver and partly into peroxid, in accordance with the following reactions:

1. 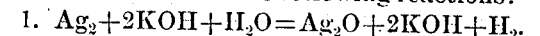

2. 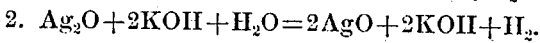

Having thus described my invention, what I claim as new therein, and desire to secure by Letters Patent, is—

1. The method of making active material for accumulator-electrodes, which consists in binding silver by means of chlorid of silver and removing the chlorin from the bound mass, substantially as described.

2. The method of making active material for accumulator-electrodes, which consists in binding silver and silver compounds with chlorid of silver, and electrolytically reducing the mass to a metallic state, substantially as described.

3. The method of making active material for accumulator-electrodes, which consists in mixing finely-divided silver with chlorid of silver, compressing and drying the mixture on a suitable grid, and electrolytically reducing the mass to metal, substantially as described.

4. The method of making active material for accumulator-electrodes, which consists in mixing finely-divided silver with silver chlorid, compressing and drying the same on a suitable grid, heating the mass to fuse the silver chlorid, and removing the chlorin by electrolysis, substantially as described.

5. The method of making active material for accumulator-electrodes, which consists in mixing finely-divided silver and silver compounds with silver chlorid, compressing and drying the mixture on a suitable grid, removing the chlorin by electrolysis and finally transforming the silver into an oxid, substantially as described.

6. The method of making active material for accumulator-electrodes, which consists in binding finely-divided silver by means of silver chlorid, removing the chlorin and finally oxidizing the resulting metallic silver, substantially as described.

7. The method of making active material for accumulator-electrodes, which consists in binding finely-divided silver by means of silver chlorid, removing the chlorin by using the material as cathode in an electrolytic cell with an alkali-metal-hydrate bath, and oxidizing the resulting silver by using the mass in a similar cell and bath as anode, substantially as described.

8. The method of making active material for accumulator-electrodes, which consists in fusing silver chlorid, removing the chlorin therefrom by using the fused mass as cathode in an electrolytic cell with an alkali-metal-hydrate solution, and oxidizing the resulting silver by using it as anode in a similar cell and solution, substantially as described.

In testimony that I claim the foregoing as my invention I have signed my name in presence of two subscribing witnesses.

ERNST WALDEMAR JUNGNER.

Witnesses:
  M. GENBERG,
  KOUR. DAHLQVIST.